United States Patent [19]

Roth

[11] Patent Number: 4,837,998
[45] Date of Patent: Jun. 13, 1989

[54] STABILIZER CORNER CONNECTION

[75] Inventor: Ernst Roth, Wilnsdorf, Fed. Rep. of Germany

[73] Assignee: Siegenia-Frank KG, Siegen, Fed. Rep. of Germany

[21] Appl. No.: 237,968

[22] Filed: Aug. 29, 1988

[30] Foreign Application Priority Data

Sep. 2, 1987 [DE] Fed. Rep. of Germany ....... 3729215

[51] Int. Cl.$^4$ .............................................. E04B 1/38
[52] U.S. Cl. ....................................... 52/288; 52/475; 52/656; 403/382
[58] Field of Search ................. 52/288, 475, 476, 477, 52/656, 657; 403/382

[56] References Cited

FOREIGN PATENT DOCUMENTS 2302538 7/1974 Fed. Rep. of Germany .
2327086 12/1974 Fed. Rep. of Germany .
2365893 9/1976 Fed. Rep. of Germany .
2949051 6/1981 Fed. Rep. of Germany .
3021309 12/1981 Fed. Rep. of Germany .

Primary Examiner—James L. Ridgill, Jr.
Attorney, Agent, or Firm—Blodgett & Blodgett

[57] ABSTRACT

A cover rail corner connection for connecting rod fittings is given a construction which ensures the three dimensional unity of two fitting components extending approximately at right angle to one another during the carrying out of the impact operations at the wing or frame of a window. A double hook 21 having an approximately C-shaped cross sectional configuration at the end of the one cover rail 5 carries a projection (31) for this purpose at each of the mutually facing ends of its side flanks 27, each projection facing away from the cover rail 5 which carries it. The edge of each projection 31 facing the limit tang 28 of the double hook 21 has a spacing from the limit tank 28 which corresponds to the thickness of the other cover rail, which carries an approximately T-shaped double hook 20. The projections 31 form effective stops in opposition to the limit tang 28 which supportingly undercut the end of the cover rail 4 carrying the approximately T-shaped double hook 20 at its transverse edges 24.

6 Claims, 3 Drawing Sheets

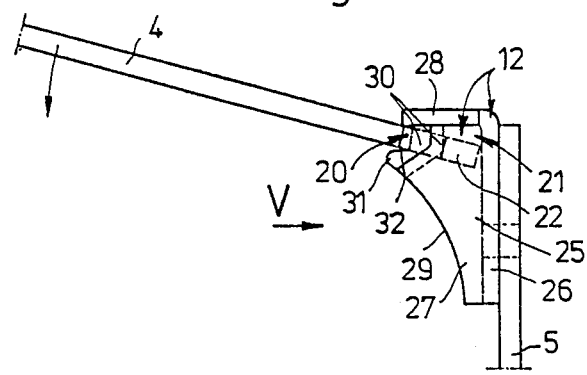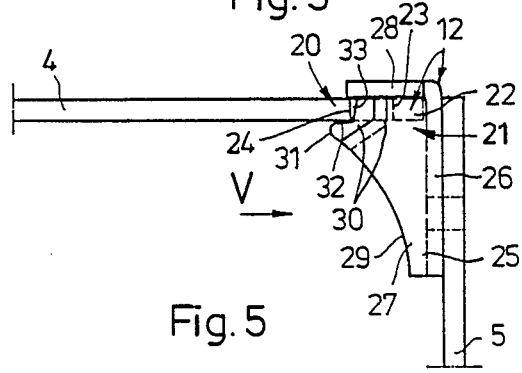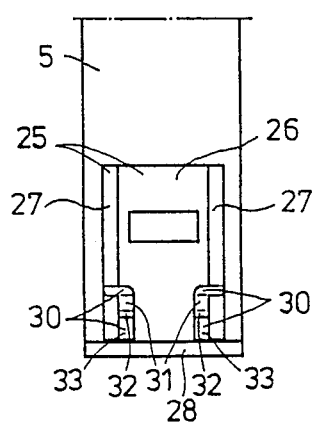

STABILIZER CORNER CONNECTION

BACKGROUND OF THE INVENTION

The invention relates to a cover rail corner connection between two matched parts of connecting rod fittings which are to be fixed essentially at a right angle to one another at the wing of at the frame of a window or of a door. Cover rails having two longitudinal edges are braceable against groove steps of a connecting rod slot in the profile of the wing or the frame. These rails are fixable by means of screws directly transverse to their planes and penetrating into the groove bottom. They are connectable with the aid of connecting links which can be brought into mutually, positively locking engagement.

A cover rail corner connection which has no loose component parts and needs no tools for its mounting but which is so designed that on mounting, the connecting parts are automatically brought into engagement, is basically shown in German Patent No. 23 02 538. The connecting parts in this case are formed as U-shaped hooks meshing in a claw-like manner, firmly arranged at the cover rail ends. The lateral flanks of a rectangular hook mouth of the one hook run vertically and the side flanks of the rectangular hook mouth of the other hook run parallel, to the specific cover rail plane. In the connecting position in each case the free end of the one hook engages into the hook mouth of the other hook. The arrangement of the hooks is such that, on mounted cover rails, the hooks are taken up by the connecting rod groove, so that the hooks have a smaller width than the cover rails and are arranged symmetrically to the longitudinal axis of the cover rails.

In further development of this construction, German reference No. OS 23 65 893 shows a cover rail corner connection which is distinguished by the fact that each hook is shaped as a double hook. On one of the cover rails the double hook has a somewhat C-shaped cross-sectional configuration in its longitudinal direction, where the ends of the side flanks are facing towards one another. On the other cover rail, the double hook has a corresponding outer contour of somewhat T-shape (the limited outer contour transverse to its plane,) where the ends of the side flanks are directed away from each other. The somewhat C-shaped part is located at a shaped part which is firmly connected with the inner surface of the cover rail and is closed by means of a limit tang which forms a supporting plate for the T-shaped double hook of the second cover rail.

This prior cover rail corner construction has proved itself advantageous in practical application because it provides an additional improvement of the positive lock between the two cover rails. It also allows a production-favorable construction of the cover rail ends which are to be coupled with one another.

Likewise the German Patent No. 23 02 538 and German reference No. OS 23 27 086 teach a cover rail corner connection which offers the possibility to interconnect the two cover rails in the corner area in such a manner that even before mounting them at the wing or frame of a window these two parts can no longer become detached. This advantage is achieved by the fact that a saw-toothed projection is provided as side flank, limiting the hook mouth at a spacing from the inside of the cover rail and running parallel to the cover rail plane. This defines a pocket which is essentially directed away from the inside of the cover rail in transverse direction. On the side flank of this pocket a stop is provided corresponding in spacing to the thickness of the second cover rail. This stop forms a support for the rear side of the second cover rail in order that this can engage (with limited horizontal swing relative to the first cover rail) with the opening of an eyelet which pushes into the hook mouth in a positively locking manner with the approximately saw-toothed projection.

The particular advantage on the cover rail corner connection according to FIGS. 1 and 2 of the German reference No. OS 23 27 086 resides in the fact that the engaging of the hook ends of the cover rails can be accomplished in all cases in a simple and reliable manner. The ends of the two cover rails which are to be intercoupled are plugged together at an obtuse angle and then the engagement is secured by bringing them into an angular position of about 90° by swiveling them relative to one another.

The invention has the object to develop an improvement in the cover rail corner connection of the German references Nos. OS 23 65 893 and OS 23 27 086. By means of the shaped part arranged in the interior angle of the cover rail corner connection - and thus taken up by the connecting rod groove - the previously interconnected cover rails (connected with one another prior to being mounted) can no longer get out of engagement during execution of the mounting operation. They form, together with the other fitting parts, an angular pre-assembled structural unit. The unit is three-dimensionally secured by the double hooks which intermesh in a claw-like manner.

SUMMARY OF THE INVENTION

The invention generally involves the provision of a double hook of somewhat C-shaped cross-sectional shape which carries one projection of the cover rail carrying it at each of the mutually facing ends of its side flanks and has a limit tang. The edge of each projection facing the limit tang of the shaped part has a spacing from this limit tang which corresponds to the thickness of the cover rail carrying the T-shaped double hook. The projections form effective stops in a direction against the limit tang of the shaped part which are adapted to undercut the end of the other cover rail which carries the T-shaped double hook on its transverse edges.

The particular advantage of such a cover rail corner connection is that along with the constructional and functional principle of the cover rail corner connection according to German reference No. OS 23 65 893 a safety connection is assured like that of German reference OS No. 23 27 086. At the same time, fitting parts whose cover rail displays the double hook with somewhat T-shaped outer contour transverse to its plane can still be used without restriction.

A further aspect of the invention results in production advantages when the shaped part forming the somewhat C-shaped double hook is a punch-bent, shaped part made of sheet metal in which the limit tang is formed by a bent-off tang which has a width corresponding approximately to the width of the cover rail and projects at both sides beyond the outer surfaces of the side flanks of the cross-sectionally somewhat C-shaped double hook.

In another aspect of the invention the side flanks of the cross-sectionally somewhat C-shaped double hook are likewise formed in each case by a bent-off tang of the punch-bent, shaped part which has a gradually enlarging width toward the limit tang along a concave, circularly curved edge. This circularly curved edge adjoins at the upper boundary edge of the projections at the mutually facing ends of the side flanks.

A further aspect of the invention is that the mutually facing ends of the side flanks of the somewhat C-shaped double hook are formed by off-sets impressed into the tangs, which extend from the inside of the bottom of the punch-bent, shaped part approximately over one third of its total length.

An aspect of the invention which is important for the stability and, especially, the optimal unity of the cover rail corner connection is that a fork-like cut is defined between the limit tang of the punch-bent, shaped part and the edge of each projection facing this part into which can be inserted the transverse edges of the cover rail carrying the T-shaped double hook.

It is a still further aspect of the invention that the mutually facing ends of the side flank of the C-shaped double hook run at approximately a right angle to the limit tang, on that surface which is in each case facing away from and distant from the projections, for a distance corresponding to the spacing between the inside of the limit tang and the edge of the projections of the edge facing it. The adjacent area, which is facing and adjoining the adjacent projection, is under an obtuse angle thereto. This construction facilitates, on the one hand, the joining of the double hooks which are to be brought to engagement and ensures, on the other hand, a limited play unity of the double hooks in their connecting position.

It may be said that the connecting rod fitting according to the German patent No. 30 21 309, uses the engagement-safety principle according to FIGS. 1 and 2 of the German reference No. OS 23 27 086 on a cover rail corner connection according to German reference No. OS 29 49 051. There, however, the connecting parts consist in each case of an angular recess formed of hook ends open to a longitudinal rail edge there. This leaves the possibility that the connection on cover rails not yet inserted into the connecting rod groove of wing or frame may glide apart in the direction of the plane of the cover rail, unless additional fitting parts are fixed to the cover rail, which parts engage with one another in a direction transverse to the cover rail planes. When such additional fitting parts are not present, the engagement connection between the two mutually coupled cover rails is not secured in the third dimension until the insertion of the unit into the connecting rod groove.

BRIEF DESCRIPTION OF THE DRAWINGS

With the aid of the drawings an embodiment of the invention is shown, as an example, and is hereunder explained in detail. In these drawings FIG. 2 shows in side elevation, the functional elements of the cover rail corner connection in the position relative to one another corresponding to the start of the coupling process, FIG. 3 shows the functional elements of the cover rail corner connection in their regular coupling position but prior to the installation into the connecting rod groove of a wing or frame profile, FIG. 5 is a view in the direction of arrow V of FIG. 2 and 3.

DESCRIPTION OF THE PREFERRED EMBODIMENT

Figure 6:
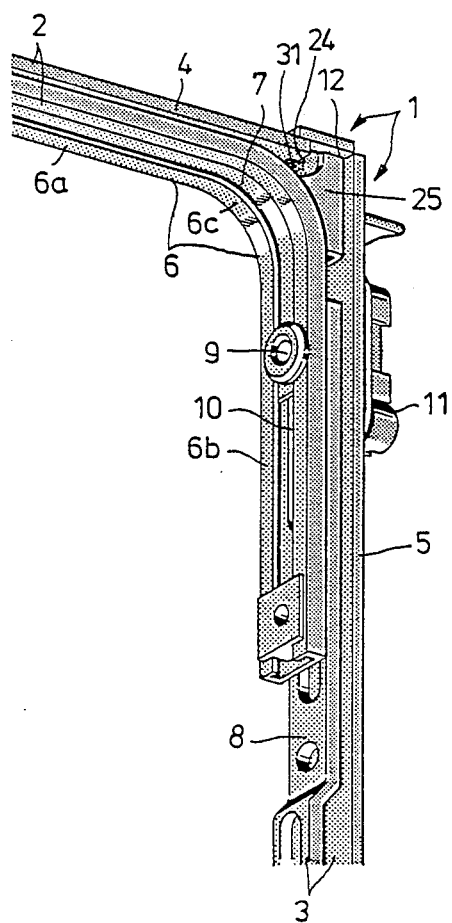
FIG. 6 is a perspective presentation of two intercoupled fitting components coupled by means of the cover rail corner connection of the present invention.

FIG. 6 of the drawing presents—approximately in natural size—the corner area of a connecting rod fitting 1 for windows, doors, etc. which is assembled of two fitting components 2 and 3 which essentially extend at a right angle to one another. The fitting component 2 has a first cover rail 4, while the fitting part component 3 has a second cover rail 5. Both cover rails 4 and 5 consist preferably of a metallic material, especially steel. They can be manufactured out of strip material with rectangular cross section.

The first cover rail 4 of the fitting component 2 carries an angular profile guide channel 6 with two straight legs 6a and 6b which are connected at a right angle to each other through a bow-like, curved center piece 6c. In this profile guide channel 6 a flexible deflecting link 7 is arranged, which is shiftable only lengthwise. It may be made, for example, of a spring steel strip etc. The link serves for the gear-operated connection of connecting rods which are shiftable lengthwise and held by the two cover rails 4 and 5. Such a connecting rod 8 is guided at the inner face of the cover rail 5 and, together with this, forms the fitting component 3. A similar connecting rod is also provided inside the cover rail 4 but is not visible in FIG. 6 of the drawing.

For the connection of the deflecting link 7 with each of the connecting rods 8 engaging pieces (dogs) are provided. In FIG. 6 only the dog 9 is shown, which protrudes through an elongated slot 10 in the bottom of the profile guide channel 6. This can be brought into engagement by means of a dog recess (not shown) in the connecting rod 8, (for example, transverse to the adjustment direction of the connecting rod 8,) in a detachable manner.

The connecting rods such as connecting rod 8, of the connecting rod fitting 1 serve for the movement of functional parts. One of them is shown in FIG. 6 and is constructed as a locking member 11. This locking member 11 is arranged to be longitudinally movable along the external broadside of the cover rail 5. For this purpose it is connected through a shaft with the connecting rod 8, which penetrates an elongated slot (not shown) in the cover rail 5.

The two fitting components 2 and 3 of the connecting rod fitting 1 can be detachably pre-assembled with one another by their cover rails 4 and 5 via a cover rail corner connection 12, into a structural unit which will reliably function at the wing or frame of a window or door.

The construction and method of operation of this cover rail corner connection 12 can be seen in detail in FIGS. 1 to 5 of the drawing and are subsequently dealt with individually.

Figure 1:
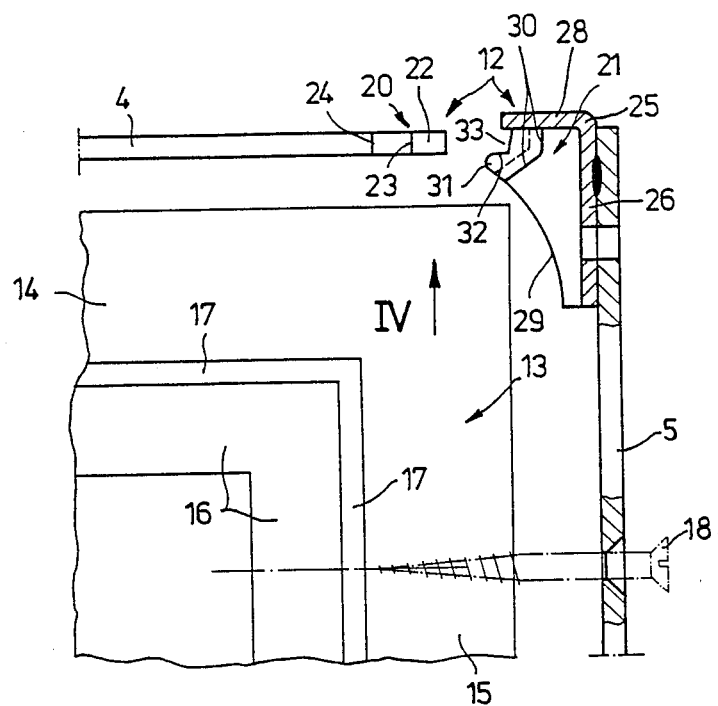
FIG. 1 shows, partly in longitudinal section and partly in side elevation, the essential functional elements of a cover rail corner connection according to the present invention.

FIG. 1 of the drawing presents a simplified partial view of the frame corner of the wing 13 of a window or door. At the horizontal leg 14 will sit the first cover rail 4 and at the vertical leg 15 will sit the second cover rail 5 of the connecting rod fitting 1.

The cover rails 4 and 5 have the purpose of flushly covering the open side of a connecting rod groove 16 leading around the wing corner. They are braced by their two longitudinal edges upon the steps 17 situated at the opening side of this connecting rod groove 16.

Screws 18 serve for the mounting of the cover rails 4 and 5 and of the fitting components 2 and 3 at the wing 13. These screws 18 penetrate the corresponding holes in cover rails 4 and 5 and are screwed into the bottom of the connecting rod groove 16.

The cover rail connection 12 is provided so that the cover rails 4 and 5 of the two fitting components 2 and 3 can be reliably fixed, by mutual attachment, even in the immediate corner area of the wing 13, without having to use screws there. The connection is formed by a first double hook 20 on the cover rail 4 and a matching complementary second double hook 21 on the cover rail 5.

As is particularly clearly evident from FIG. 1, the first double hook 20 on the cover rail 4 has a somewhat T-shaped outer contour, in which the free hook ends 22 are facing away from one another. The double hook 20 thus lies fully in the cover rail plane and can therefore be fabricated through a single punching process. The coupling flanks 23 on the hook ends 22 of the double hook 20 extend transversely to the main plane of the cover rail, but essentially parallel to the transverse edge 24 of the cover rail. The double hook 20 adjoins the cover rail here with its web, which is preferably made of the same material.

Figure 4:
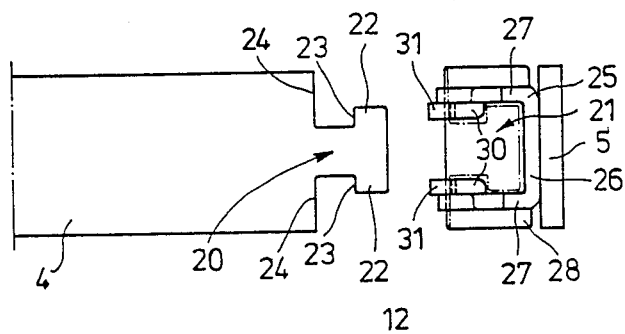
FIG. 4 is a view in the direction of arrow IV of FIG. 1.

FIG. 4 shows clearly that the second double hook 21 sits on the inside of the second cover rail 5 and has a somewhat C-shaped cross section. It can be made from a shaped part 25, especially a punch-bent, shaped part of sheet metal. It is firmly connected, through a web wall 26, with the inside of the cover rail 5, for example by welding. From the web wall 26 two tangs are bent off approximately at right angle as side flanks 27, which lie spaced and parallel to one another. Likewise, a limit tang 28 is bent off at approximately a right angle from the web wall 26 and extends in the same direction as the two side tangs 27, but is oriented transverse to them and acts as limit tang of the shaped part 25. This closes off the approximately C-shaped cross-sectional configuration of the double hook 21 (comprised by the shaped part 25) at the end which lies directly adjacent to the end of the cover rail 5. The limit tang 28 has a width which corresponds at least approximately to the width of the cover rails 4 and 5 and protrudes on both sides beyond the external surfaces of the side flanks, as is clearly evident from the FIGS. 4 and 5.

It can be seen from FIGS. 1 to 3 that the side flanks 27 of the shaped part 25 have a width which gradually increases toward the limit tang 28, forming a circularly curved edge 29. The curvature of the edge 29 corresponds to the curvature of the outer surface of the bow-shaped center piece 6c of the profile guide channel 6, as is evident in FIG. 6.

The shaped part 25 which forms the double hook 21 on the inner side of the cover rail 5 has a somewhat C-shaped cross sectional configuration because offsets 30, each directed from outwards to the inward, are impressed into the two side flanks 27. These offsets form the mutually facing ends of the side flanks 27. The inner spacing from one another is only slightly wider than the width of the web part of the double hook 20 on the cover rail 4.

The offsets 30 are formed into the side flanks 27 of the shaped part 25 in such a manner that they extend from the inside of the limit tang 28 through only about one third of the total length of the shaped part 25. The surfaces of the offsets 30 (or the mutually facing ends of the side flanks which they form) which face the inside of the web wall 26 have a special shape. First of all, over a distance which corresponds approximately to the thickness of the first cover rail 4 the respective faces of the offsets 30 run at a right angle from the plane of the inner surface of the limit tang 28. The adjoining area on the other hand is directed away from the web wall 26 under an obtuse angle. This special shape of the offsets 30 (and the mutually facing ends of the side flanks which they form) can be most clearly seen in FIGS. 1 to 3 of the drawings. The inclined course (away from the web wall 26) of those sections of the offset surfaces which are further from the limit tang facilitates the engaging of the approximately T-shaped double hook 20 of the first cover rail 4 into the somewhat C-shaped double hook 21 of the second cover rail 5. This is accomplished by a rotating motion, as may be seen from a comparison of the FIGS. 2 and 3. On the other hand, the sections of these offset surfaces which are directed parallel to the web wall 26 ensure the retaining engagement of the double hook 20 in its coupled end position, as is evident from FIG. 3. This is because the coupling flanks 23 of the double hook 20 undergrip the correspondingly oriented surface of the offsets 30 adjacent to the limit tang 28 in a direction transverse to the plane of the cover rail 4. This is evident from FIG. 3 and, in broken lines, also in FIG. 4.

Especially in the FIG. 1 to 3 of the drawing it can be seen that the C-shaped double hook carries a projection 31 on each of the mutually facing ends of its side flanks (formed by the offsets 30). Each projection is facing away from the cover rail 5 which carries it. The edge 32 of each projection which faces the limit tang 28 has a spacing from the inside of this limit tang 28 which corresponds to the thickness of the cover rail 4. The edges 32 of the projections 31 thus form effective stops in opposition to the limit tang 28, which edges undercut and support the end of the second cover rail 4 at its transverse edges 24. This is made clear in FIG. 3 and also in broken lines—in FIG. 4.

FIG. 1 to 3 show that a bifurcated notch 33 is defined between the limit tang 28 of the shaped part 25 and the facing edge 32 of each projection 31. In the working position of the cover rail corner connection 12, this notch engages the cover rail 4, by its transverse edges 24, as illustrated in FIG. 3. The cover rail corner connection 12 of the present invention, being equipped with the two double hooks 20 and 21 and with the projections 31, permits a three-dimensional, shape-stabilized and forced-locking coupling between the cover rails 4 and 5 of the two fitting components 2 and 3. This facilitates the manipulation of the connecting rod fitting 1 during installation in the wing 13, and improves the impact action in the area of the wing corners.

Clearly, minor changes may be made in the form and construction of this invention without departing from the material spirit of either. Therefore, it is not desired to confine the invention to the exact form shown herein and described but it is desired to include all subject matter that properly comes within the scope claimed.

The invention having thus been described, what is claimed as new and desired to secure by Letters Patent is:

1. A cover rail corner connection between two fitting components of connecting rod fittings which are mountable at right angles to each other on the wing or at the frame of a window or of a door, in which cover rails are braceable against groove steps of a connecting rod slot in the profile of the wing or the frame by longitudinal edges and are fixable with fasteners directed transverse to their planes in the bottom of the slot and are connectable with the aid of connecting links which can be brought into mutually positively locking engagement, wherein the connecting links comprise first and second double hooks which firmly intermesh in a claw-like manner provided at the cover rail ends and wherein the second double hook has an approximately C-shaped cross-sectional configuration in longitudinal direction and has side-flanks with ends which are facing one another and has outer surfaces, wherein the second double hook on the second cover rail has an approximately T-shaped outer contour transverse to its plane and has side flanks facing away from one another, wherein the C-shaped double hook is embodied in a shaped part which is firmly connected with the first cover rail and is closed by limit tang which forms a supporting plate for the T-shaped double hook of the second cover rail, characterized by the fact that, the C-shaped double hook (21) has a projection (31) at each of the mutually facing ends (30) of its side flanks (27) the projections facing away from the cover rail (5) which carries the C-shaped double hook, that an edge (32) of each projection (31) facing towards the limit tang (28) of the shaped part (25) has a spacing from the limit tang (28) which corresponds to the thickness of the first cover rail (4) which carries the T-shaped double hook (20), and that the projections (31) have edges facing the limit tang which form effective stops in opposition to the limit tang (28) which edges supportingly undercut the end of the second cover rail (4), at its transverse edges.

2. A cover rail corner connection according to claim 1, characterized by the fact that, the mutually facing ends (30) of the side flanks (27) of the C-shaped double hook (21) are formed by offsets impressed into the side flanks (27), which extend from the inside of the limit tang (28) of the punch-bend, shaped part (25) approximately over one third of the total length of the part (25).

3. A cover rail corner connection according to claim 1, characterized by the fact that, a bifurcated notch is defined between the limit tang(28) of the punch-bent, shaped part (25) and the facing edge (32) of each projection (31).

4. A cover rail corner connection according to claim 1, characterized by the fact that, the mutually facing ends (30) of the side flanks (27) each have a surface distant from the respective projection (31) and a surface adjoining the respective projection and wherein the surface of the mutually facing ends (30) which are distant from the projections run approximately at right angles to the plane of the limit tang, for a distance corresponding to the distance between the inside of the limit tang (28) and the edge (32) of the projections (31) facing it while the surface adjoining the projections is at an obtuse angle toward the projection.

5. A cover rail corner connection according to claim 1, characterized by the fact that, a shaped part (25) forms the C-shaped double hook (21) and consists of a punch-bent, shaped part of sheet metal on which a limit is formed by a bent tang (28) which tang has a width corresponding to the width of the cover rails and which projects at both sides beyond the outer surfaces of the side flanks (27) of the C-shaped double hook (21).

6. A cover rail corner connection according to claim 3, characterized by the fact that, the side flanks (27) of the C-shaped double hook (21) are each formed by a bent-off side tang of the punch-bent, shaped part (25) which tang has a width which gradually increases towards the limit tang (28), along a concave, circularly curved edge (29), wherein the circularly curved edge (29) adjoins an upper limiting edge of the projections (31) at the mutually facing ends (30) of the side flanks (27).

* * * * *